(12) United States Patent
Fender

(10) Patent No.: US 12,106,068 B2
(45) Date of Patent: Oct. 1, 2024

(54) COMPUTATIONAL MEMORY FOR SORTING MULTIPLE DATA STREAMS IN PARALLEL

(71) Applicant: UNTETHER AI CORPORATION, Toronto (CA)

(72) Inventor: Joshua Fender, East York (CA)

(73) Assignee: UNTETHER AI CORPORATION, Toronto (CA)

( * ) Notice: Subject to any disclaimer, the term of this patent is extended or adjusted under 35 U.S.C. 154(b) by 0 days.

(21) Appl. No.: 17/874,454

(22) Filed: Jul. 27, 2022

(65) Prior Publication Data
US 2024/0036818 A1     Feb. 1, 2024

(51) Int. Cl.
*G06F 7/24*     (2006.01)
*G06F 7/02*     (2006.01)

(52) U.S. Cl.
CPC . *G06F 7/24* (2013.01); *G06F 7/02* (2013.01)

(58) Field of Classification Search
CPC ......... G06F 7/02; G06F 7/24–26; G06F 7/544
USPC ....................................................... 708/207
See application file for complete search history.

(56) References Cited

U.S. PATENT DOCUMENTS

| | | | | |
|---|---|---|---|---|
| 3,505,653 A | * | 4/1970 | Kautz | G06F 9/4843 |
| | | | | 712/300 |
| 4,030,077 A | | 6/1977 | Florence et al. | |
| 4,520,456 A | * | 5/1985 | Miranker | G06F 7/24 |
| | | | | 712/202 |
| 5,535,384 A | * | 7/1996 | Kasahara | G06F 7/22 |
| | | | | 707/752 |
| 6,128,614 A | | 10/2000 | Mennemeier et al. | |
| 2007/0156685 A1 | | 7/2007 | Inoue et al. | |
| 2013/0212354 A1 | | 8/2013 | Mimar | |
| 2014/0379735 A1 | * | 12/2014 | Hsu | G06F 7/24 |
| | | | | 707/752 |

* cited by examiner

*Primary Examiner* — Matthew D Sandifer
(74) *Attorney, Agent, or Firm* — Perry + Currier Inc.

(57) ABSTRACT

A processing device having a sequence of sorting elements arranged in an array. Each of the sorting elements stores a previously retained value therein and receives an input value from a previous sorting element. Each sorting element applies retention logic to select one of the input value or the retained value to be passed to the next sorting element in the array. The value that is passed to the next sorting element can either be set to be the larger, or the smaller, of the input value and the previously retained value, as desired. Rows of processing elements in the array operate in parallel such that large data streams are sorted in parallel (with the data values moving down from one row of processing elements to the next row such that the largest, or the smallest, data values accumulating in the final row of processing elements).

16 Claims, 8 Drawing Sheets

COMPUTATIONAL MEMORY FOR SORTING MULTIPLE DATA STREAMS IN PARALLEL

TECHNICAL FIELD

The present invention relates to computational memory and neural networks.

BACKGROUND OF THE INVENTION

Deep learning has proven to be a powerful technique for performing functions that have long resisted other artificial intelligence approaches. For example, deep learning may be applied to recognition of objects in cluttered images, speech understanding and translation, medical diagnosis, gaming, and robotics. Deep learning techniques typically apply many layers (hence "deep") of neural networks that are trained (hence "learning") on the tasks of interest. Once trained, a neural network may perform "inference", that is, inferring from new input data an output consistent with what it has learned.

Neural networks, which may also be called neural nets, perform computations analogous to the operations of biological neurons, typically computing weighted sums (or dot products) and modifying the results with a memoryless nonlinearity. However, it is often the case that more general functionality, such as memory, multiplicative nonlinearities, and "pooling", are also required.

In many types of computer architecture, power consumption due to physically moving data between memory and processing elements is non-trivial and is frequently the dominant use of power. This power consumption is typically due to the energy required to charge and discharge the capacitance of wiring, which is roughly proportional to the length of the wiring and hence to distance between memory and processing elements. As such, processing a large number of computations in such architectures, as generally required for deep learning and neural networks, often requires a relatively large amount of power. In architectures that are better suited to handle deep learning and neural networks, other inefficiencies may arise, such as increased complexity, increased processing time, and larger chip area requirements.

Neural nets that use Single-Shot Detection (SSD) generate multiple categories for a large number of candidate boxes within a frame. For each candidate box, a probability (0.0 to 1.0) is given for each category. A sorting system is then used. Unfortunately, traditional sorting approaches are tedious, time consuming and energy intense. This is because each one of the candidate boxes needs to be sorted both by probability and by category before any redundant candidate boxes can be removed. What is instead desired is an efficient hardware system for sorting multiple categories of data in parallel. Ideally, such an efficient system would use the efficiencies of multiple parallel processing elements, but in a manner that would not be limited by the same Single Instruction Multiple Data (SIMD) controller instructions. Rather, it would be desirable to provide a system in which different processing elements in a row of processing elements can be assigned to sort different categories of data under the control of parallel (SIMD) controller instructions. In addition, it would be highly desirable for such a system and hardware to be energy efficient, for example, without having to store large amounts of candidate box information in random-access memory. As will be shown herein, the present system addresses these concerns and provides such a desired system.

SUMMARY OF THE INVENTION

The present invention provides a system and preferred hardware configuration for sorting parallel streams of data elements in an efficient way. In preferred aspects, a sequence of sorting elements arranged in an array comprising rows of processing elements. Each of the sorting elements in each row has a previously retained value stored therein and receives an input value from a previous sorting element (typically in the row above). Each sorting element then applies retention logic to select one of the input value or the previously retained value to be passed to the next sorting element in the array (typically in the row below). The value that is not passed can be retained at the sorting element.

In preferred aspects, the value that is passed to the next sorting element can either be set to be the larger (or the smaller) of the input value and the previously retained value, as desired. As a result, rows of processing elements in the array can operate in parallel such that large data streams can be sorted in parallel. For example, when using the present array format, the sorting elements in one row of the array can each receive their input values from the sorting elements in the row above. As such, data can be passed down the array (from one row to the next) and sorted in parallel. If each sorting element in the array has been set to pass the larger of its (previously) retained and (recently) inputted values, the largest values will be passed down the array to the final (i.e.: bottom) row of the array. Conversely, should the sorting elements be instead configured to pass the smallest values, then the smallest values will be passed down the array to the bottom row of the array.

In one preferred embodiment, the present system provides a device comprising a sequence of sorting elements configured to receive a sequence of values to sort. Each sorting element is configured to apply retention logic to an input value (preferably received from a previous sorting element) and a retained value (that is already stored in the sorting element). The retention logic is configured to retain at the sorting element one of either the input value and the retained value, and pass the other of the input value and the retained value to the next sorting element. In preferred aspects, the sequence of sorting elements is configured to output the sequence of values as sorted based on the retention logic.

In preferred aspects, the retention logic is programmable and numerically compares the input value to the retained value. In some aspects, it retains the greater of the input value and the retained value and passes the lesser of the input value and the retained value to the next sorting element. In other aspects, it retains the lesser of the input value and the retained value and passes the greater of the input value and the retained value to the next sorting element. Should the input value and the retained value be the same, the retention logic then passes such value (i.e.: the same value as either one of the input or retained values) to the next sorting element.

An advantage of this system is that it provides an efficient hardware configuration to sort multiple categories of data in parallel. Each processing element essentially acts as a "filter" passing the greater (or lesser) number value therethrough. By using the present hardware configuration in a Single-Shot Detection (SSD) neural net, the probabilities (0.0 to 1.0) stored in multiple candidate boxes can be sorted as they arrive, without having to store large amounts of box information in random access memory. This approach saves valuable energy. Moreover, by sorting the boxes by probability (independently for each category of data sorted), redundant candidate boxes can be quickly eliminated.

In further preferred aspects, the present device further comprises a terminal sorting element (located for example at the bottom row of the various successive rows of sorting elements). The terminal sorting element is the final sorting element to receive data (after passing through the various rows of sorting elements there-above). Preferably, the terminal element has terminal retention logic configured to retain one of the input value and the retained value and discard the other of the input value and the retained value.

One benefit of this system is that a very long list of numbers can be sorted (e.g.: 15,130 numbers when using an RN34-SSD system) with a much smaller number (e.g.: a "top-500") of processing elements each storing only two numbers in memory (i.e.: the number that is passed down and the number that is retained). As such, it is not necessary to store, for example, 15,130 numbers in memory and then later sort or discard them. Rather, after the entire set of 15,130 numbers is sorted using the present system, only 1,000 numbers (i.e.: corresponding to the top-500 example where each processing element only stores two numbers) need to be stored.

In further preferred aspects, the present device comprises a sequence of processing elements (each having a processor and a memory), wherein each processing element includes either a single sorting element or a subsequence of sorting elements. In further preferred aspects, a controller simultaneously applies the retention logic to the sequence of sorting elements to thereby control the sequence of sorting elements.

DETAILED DESCRIPTION OF THE DRAWINGS

The techniques described herein aim to improve computational memory to handle the sorting of multiple data streams in parallel. In preferred aspects, processing elements act as sorting elements to pass the higher (or the lower) of values they receive from one row of processors in the array to the next row of processors such that efficient parallel processing and sorting of input values can be achieved. Alternatively, the values can be passed from one column of processors in the array to the next column of processors. Moreover, the physical arrangement of the rows and columns of the processing elements in the array can be independent of the sorting arrangement of the rows and columns. Thus, it is to be understood that the present system encompasses all geometries and arrangements of sorting with the sorting elements and processing elements in the array. The parallel processing described herein is suitable for neural networks, particularly where power consumption is a concern, such as in battery-powered devices, portable computers, smartphones, wearable computers, smart watches, and the like. The parallel processing described herein is ideally suited for Single-Shot Detection (SSD) neural nets, where probabilities (0.0 to 1.0) stored in multiple candidate boxes, and sorted as they arrive. Advantageously, the present hardware sorting architecture avoids having to store large amounts of box information in random access memory, and thereby saves considerable energy and time.

Figure 1:
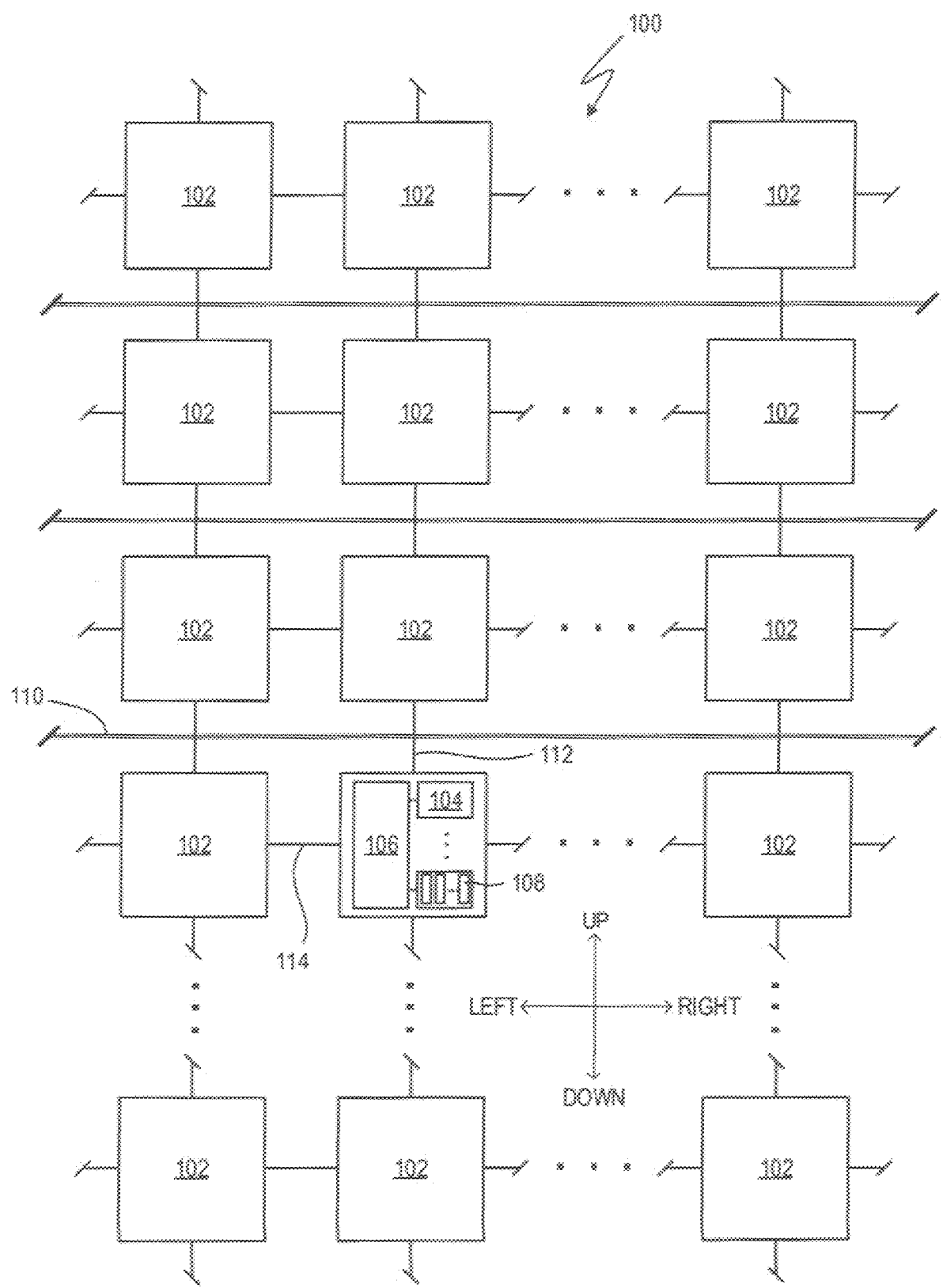
FIG. 1 is a block diagram of an example computing device that includes banks of processing elements.

FIG. 1 shows a computing device 100. The computing device 100 includes a plurality of banks 102 of processing elements. The banks 102 may be operated in a cooperative manner to implement a parallel processing scheme, such as a single instruction, multiple data (SIMD) scheme.

The banks 102 may be arranged in a regular rectangular grid-like pattern, as illustrated. For sake of explanation, relative directions mentioned herein will be referred to as up, down, vertical, left, right, horizontal, and so on. However, it is understood that such directions are approximations, are not based on any particular reference direction, and are not to be considered limiting.

Any practical number of banks 102 may be used. Limitations in semiconductor fabrication techniques may govern. In some examples, 512 banks 102 are arranged in a 32-by-16 grid.

A bank 102 may include a plurality of rows 104 of processing elements (PEs) 108 and a controller 106. A bank 102 may include any practical number of PE rows 104. For example, eight rows 104 may be provided for each controller 106. In some examples, all banks 102 may be provided with the same or similar arrangement of rows. In other examples, substantially all banks 102 are substantially identical. In still other examples, a bank 102 may be assigned a special purpose in the computing device and may have a different architecture, which may omit PE rows 104 and/or a controller 106.

Any practical number of PEs 108 may be provided to a row 104. For example, 256 PEs may be provided to each row 104. Continuing the numerical example above, 256 PEs provided to each of eight rows 104 of 512 banks 102 means the computing device 100 includes about 1.05 million PEs 108, less any losses due to imperfect semiconductor manufacturing yield.

A PE 108 may be configured to operate at any practical bit size, such as one, two, four, or eight bits. PEs may be operated in pairs to accommodate operations requiring wider bit sizes.

Instructions and/or data may be communicated to/from the banks 102 via an input/output (I/O) bus 110. The I/O bus 110 may include a plurality of segments.

A bank 102 may be connected to the I/O bus 110 by a vertical bus 112. Additionally or alternatively, a vertical bus 112 may allow communication among banks 102 in a vertical direction. Such communication may be restricted to immediately vertically adjacent banks 102 or may extend to further banks 102.

A bank 102 may be connected to a horizontally neighboring bank 102 by a horizontal bus 114 to allow communication among banks 102 in a horizontal direction. Such communication may be restricted to immediately horizontally adjacent banks 102 or may extend to further banks 102.

Communications through any or all of the busses 110, 112, 114 may include direct memory access (DMA) to memory of the rows 104 of the PEs 108. Additionally or alternatively, such communications may include memory access performed through the processing functionality of the PEs 108.

The computing device 100 may include a main processor (not shown) to communicate instructions and/or data with the banks 102 via the I/O bus 110, manage operations of the banks 102, and/or provide an I/O interface for a user, network, or other device. The I/O bus 110 may include a Peripheral Component Interconnect Express (PCIe) interface or similar.

Figure 2:
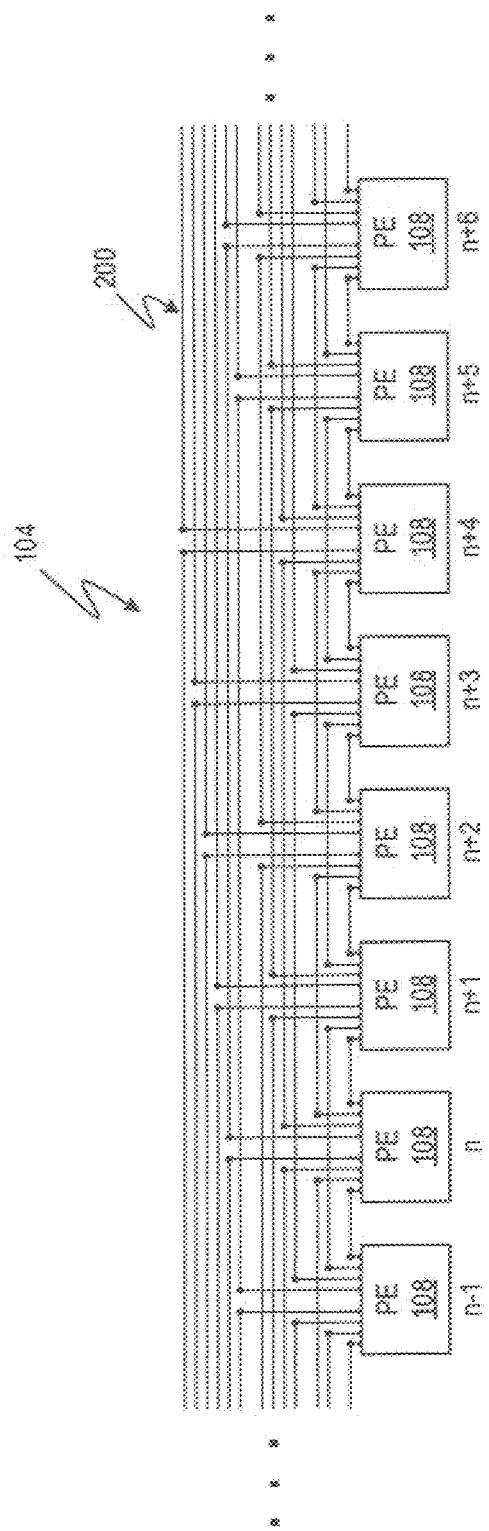
FIG. 2 is a block diagram of a row of processing elements in an exemplary array of processing elements.

FIG. 2 shows an example row 104 including an array of processing elements 108, which may be physically arranged in a linear pattern (e.g., a physical row). Each PE 108 includes an arithmetic logic unit (ALU) to perform an operation, such as addition, multiplication, and so on.

The PEs 108 are mutually connected to share or communicate data. For example, interconnections 200 may be provided among the array of PEs 108 to provide direct communication among neighboring PEs 108.

A PE 108 (e.g., indicated at "n") is connected to a first neighbor PE 108 (i.e., n+1) that is immediately adjacent the PE 108. Likewise, the PE 108 (n) is further connected to a second neighbor PE 108 (n+2) that is immediately adjacent the first neighbor PE 108 (n+1). A plurality of PEs 108 may be connected to neighboring processing elements in the same relative manner, where n merely indicates an example PE 108 for explanatory purposes. That is, the first neighbor PE 108 (n+1) may be connected to its respective first and second neighbors (n+2 and n+3).

A given PE 108 (e.g., n+5) may also be connected to an opposite first neighbor PE 108 (n+4) that is immediately adjacent the PE 108 (n+5) on a side opposite the first neighbor PE 108 (n+6). Similarly, the PE 108 (n+5) may further be connected to an opposite second neighbor PE 108 (n+3) that is immediately adjacent the opposite first neighbor PE 108 (n+4).

Further, a PE 108 may be connected to a fourth neighbor PE 108 that is immediately adjacent a third neighbor PE 108 that is immediately adjacent the second neighbor PE 108. For example, the PE 108 designated at n may be connected to the PE designated at n+4. A connection of the PE 108 (n) to its third neighbor PE 108 (n+3) may be omitted. The fourth-neighbor connection may also be provided in the opposite direction, so that the PE 108 (n) connects to its fourth neighbor PE 108 at n−4 (not shown).

Still further, a PE 108 may be connected to a sixth neighbor PE 108 that is immediately adjacent a fifth neighbor PE 108 that is immediately adjacent the fourth neighbor PE 108. For example, the PE 108 designated at n may be connected to the PE designated at n+6. A connection of the PE 108 (n) to its fifth neighbor PE 108 (n+5) may be omitted. The sixth-neighbor connection may also be provided in the opposite direction, so that the PE 108 (n) connects to its sixth neighbor PE 108 at n−6 (not shown).

Again, a plurality of PEs 108 may be connected to neighboring processing elements in the above relative manner. The designation of a PE 108 as n may be considered arbitrary for non-endmost PEs 108. PEs 108 at the ends of the array may omit certain connections by virtue of the array terminating. In the example of each PE 108 being connected to its first, second, fourth, and sixth neighbor PEs 108 in both directions, the six endmost PEs 108 have differing connections.

Figure 3:
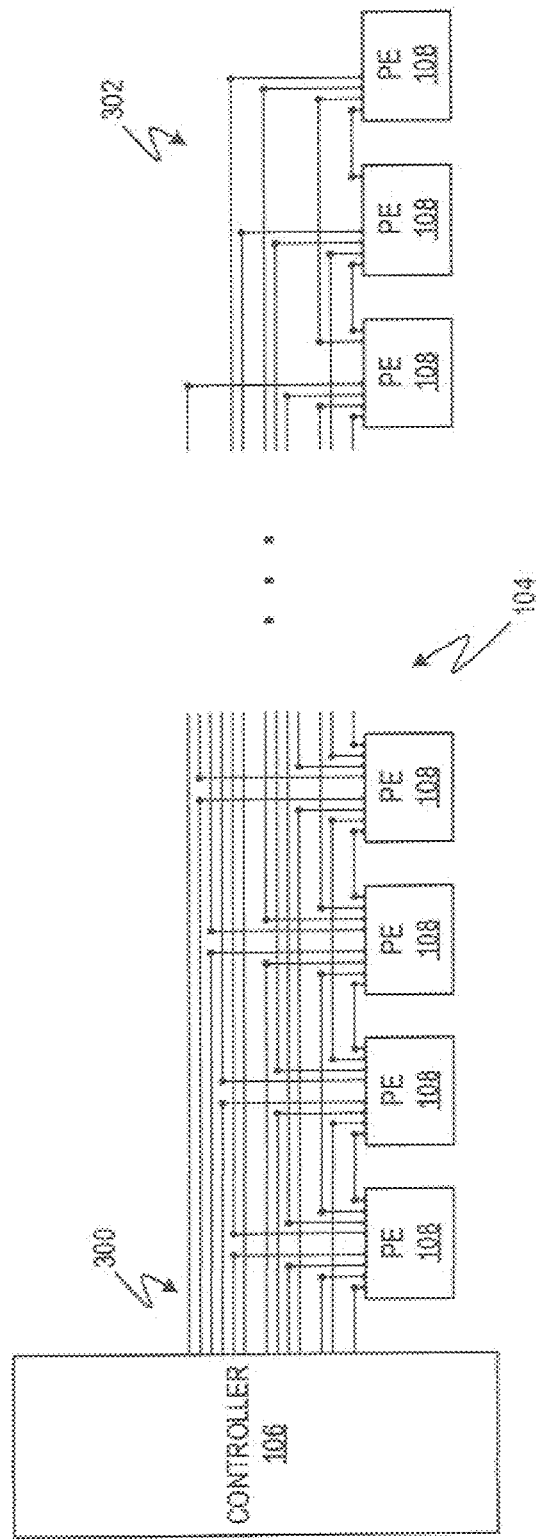
FIG. 3 is a block diagram of a row of processing elements in an exemplary array of processing elements with a controller.

With reference to FIG. 3, endmost PEs 108 at one end of a row 104 may have connections 300 to a controller 106. Further, endmost PEs 108 at the opposite end of the row 104 may have a reduced number of connections 302. Additionally or alternatively, end-most PEs 108 of one bank 102 may connect in the same relative manner through the controller 106 and to PEs 108 of an adjacent bank 102. That is, the controller 106 may be connected between two rows 104 of PEs 108 in adjacent banks 102, where the two rows 104 of PEs 108 are connected in the same manner as shown in FIG. 2.

Figure 4A:
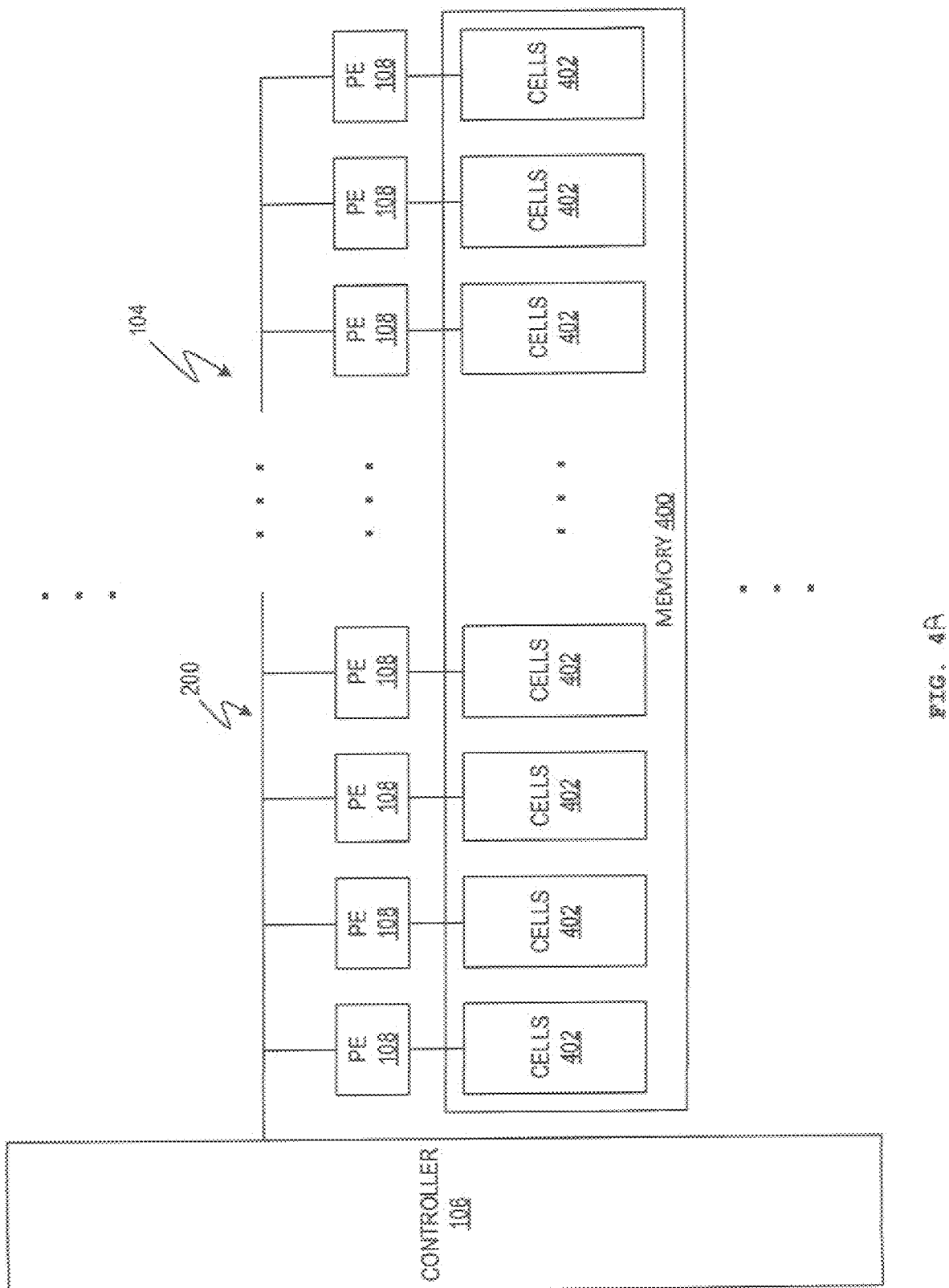
FIG. 4A is a block diagram of a row of processing elements in an exemplary array of processing elements with a controller and memory.

With reference to FIG. 4A, a row 104 of PEs 108 may include memory 400 to store data for the row 104. A PE 108 may have a dedicated space in the memory 400. For example, each PE 108 may be connected to a different range of memory cells 402. Any practical number of memory cells 402 may be used. In one example, 144 memory cells 402 are provided to each PE 108. Note that in FIG. 4A the interconnections 200 among the PEs 108 and with the controller 106 are shown schematically for sake of explanation.

The controller 106 may control the array of PEs 108 to perform a SIMD operation with data in the memory 400. For example, the controller 106 may trigger the PEs 108 to simultaneously add two numbers stored in respective cells 402.

The controller 106 may communicate data to and from the memory 400 though the PEs 108. For example, the controller 106 may load data into the memory 400 by directly loading data into connected PEs 108 and controlling PEs 108 to shift the data to PEs 108 further in the array. PEs 108 may load such data into their respective memory cells 402. For example, data destined for rightmost PEs 108 may first be loaded into leftmost PEs and then communicated rightwards by interconnections 200 before being stored in rightmost memory cells 402. Other methods of I/O with the memory, such as direct memory access by the controller 106, are also contemplated. The memory cells 402 of different PEs 108 may have the same addresses, so that address decoding may be avoided to the extent possible.

Data stored in memory cells 402 may be any suitable data, such as operands, operators, coefficients, vector components, mask data, selection data, and similar. Mask data may be used to select portions of a vector. Selection data may be used to make/break connections among neighboring PEs 108.

Further, the controller 106 may perform a rearrangement of data within the array of PEs 108 by controlling communication of data through the interconnections 200 among the array of PEs 108. A rearrangement of data may include a rotation or cycling that reduces or minimizes a number of memory accesses while increasing or maximizing operational throughput. Other examples of rearrangements of data include reversing, interleaving, and duplicating.

Figure 4B:
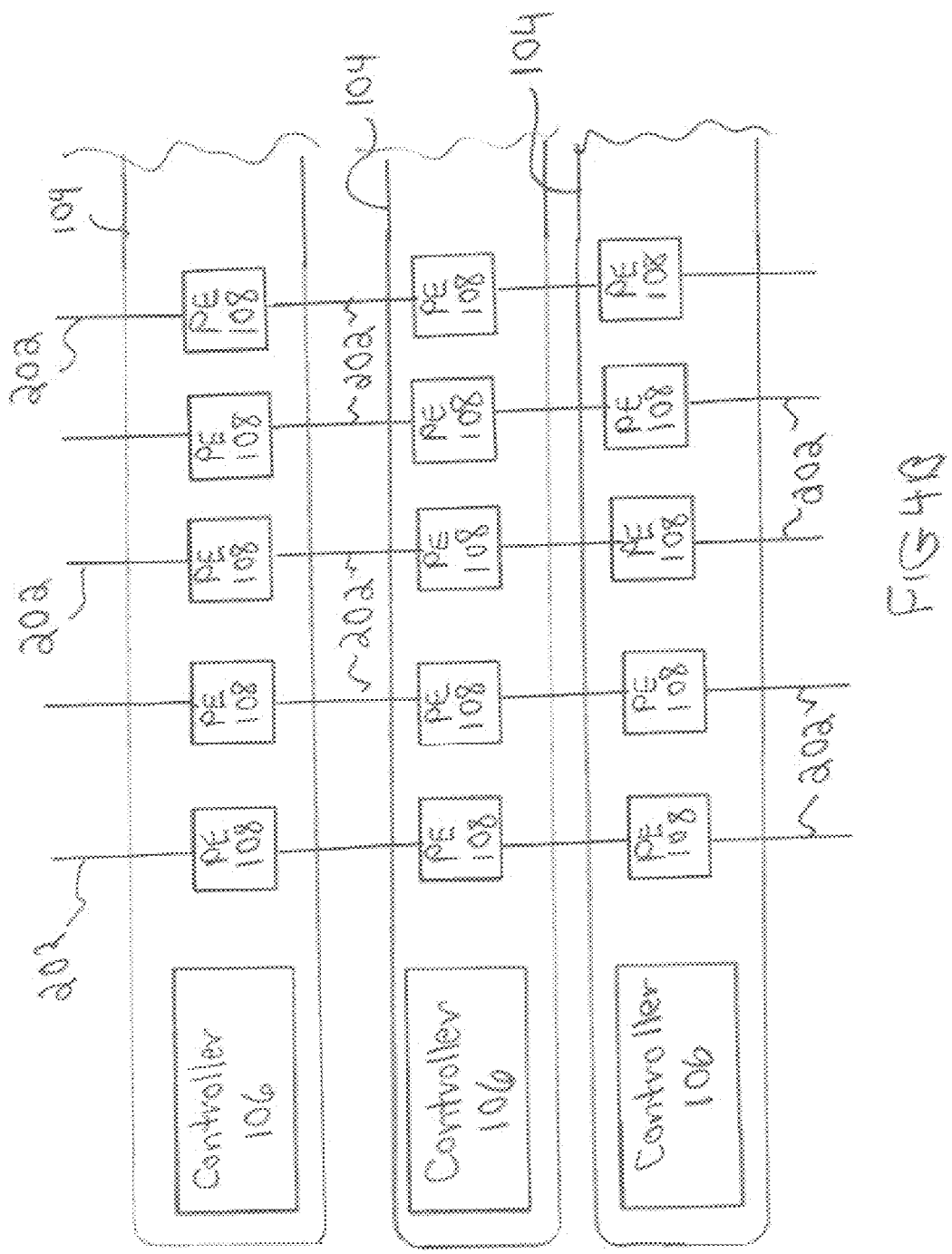
FIG. 4B is a block diagram of an array of processing elements showing connections running between columns of processing elements.

In other examples as seen in FIG. 4B, a set of interconnections 202 may be provided to connect PEs 108 in up-down (column-based) connections, so that information may be shared directly between PEs 108 that are in adjacent rows. In this description, interconnections 202 and related components that are discussed with regard to left-right (row-based) connections among PEs apply in principle to up-down (column-based) connections among PEs. Note, in FIG. 4B, processing elements 108 each have memories and caches, but these are omitted for clarity of illustration.

Figures 5, 6:
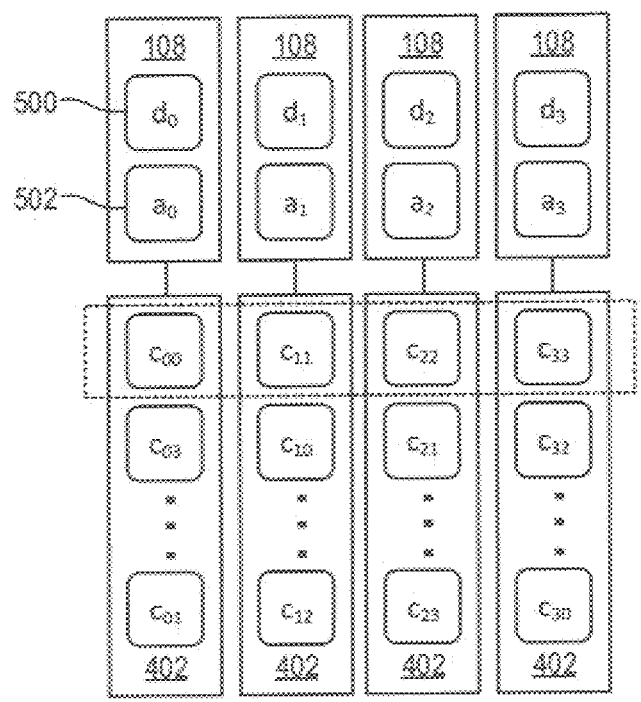
FIG. 5 is a schematic diagram of example processing elements and related memory cells.
FIG. 6 is an equation for an example matrix multiplication carried out by the processing elements and memory cells of FIG. 5.

FIG. 5 shows an array of PEs 108 and related memory cells 402. Each PE 108 may include local registers 500, 502 to hold data undergoing an operation. Memory cells 402 may also hold data contributing to the operation. For example, the PEs 108 may carry out a matrix multiplication, as shown in FIG. 6.

A matrix multiplication may be a generalized matrix-vector multiply (GEMV). A matrix multiplication may use a coefficient matrix and an input vector to obtain a resultant vector. In this example, the coefficient matrix is a four-by-four matrix and the vectors are of length four. In other examples, matrices and vectors of any practical size may be used. In other examples, a matrix multiplication may be a generalized matrix-matrix multiply (GEMM).

As matrix multiplication involves sums of products, the PEs 108 may additively accumulate resultant vector components d0 to d3 in respective registers 500, while input vector components a0 to a3 are multiplied by respective coefficients $c_{00}$ to $c_{33}$. That is, one PE 108 may accumulate a resultant vector component d0, a neighbor PE 108 may accumulate another resultant vector component d1, and so on. Resultant vector components $d_0$ to $d_3$ may be considered dot products. Generally, a GEMV may be considered a collection of dot products of a vector with a set of vectors represented by the rows of a matrix.

To facilitate matrix multiplication, the contents of registers 500 and/or registers 502 may be rearranged among the PEs 108. A rearrangement of resultant vector components $d_0$ to $d_3$ and/or input vector components $a_0$ to $a_3$ may use the direct interconnections among neighbor PEs 108, as discussed above. In this example, resultant vector components $d_0$ to $d_3$ remain fixed and input vector components $a_0$ to $a_3$ are moved. Further, coefficients $c_{00}$ to $c_{33}$ may be loaded into memory cells to optimize memory accesses.

In the example illustrated in FIG. 5, the input vector components a0 to a3 are loaded into a sequence of PEs 108 that are to accumulate resultant vector components d0 to d3 in the same sequence. The relevant coefficients $c_{00}$, $c_{11}$, $c_{22}$, $c_{33}$ are accessed and multiplied by the respective input vector components $a_0$ to $a_3$. That is, $a_0$ and $c_{00}$ are multiplied and then accumulated as $d_0$, $a_1$ and $c_{11}$ are multiplied and then accumulated as $d_1$, and so on.

Figure 7:
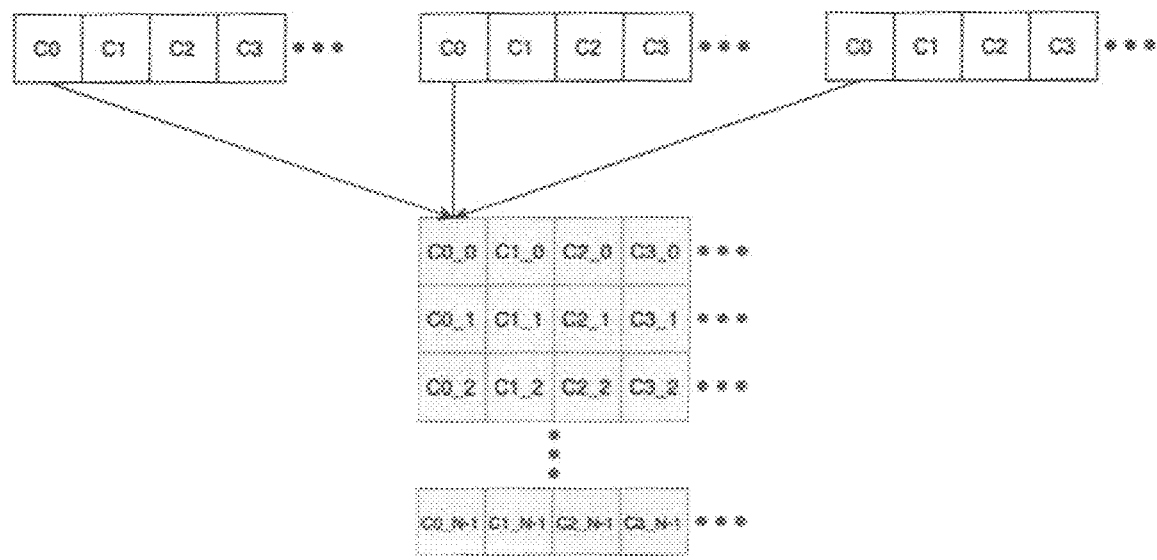
FIG. 7 is a schematic illustration of values being sorted in an array of processing elements.
Figure 8:
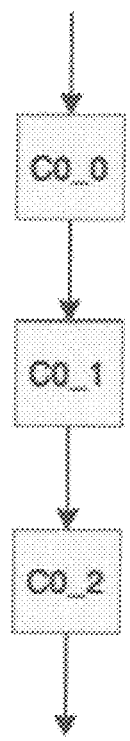
FIG. 8 is a schematic illustration of values passing down through processing elements in successive rows of processing elements in a sorting operation.

FIG. 7 is a schematic illustration of values being sorted in an array of processing elements, and FIG. 8 is a schematic illustration of values passing down through successive rows of processing elements in a sorting operation, as follows.

FIG. 7 illustrates an array of values stored in the registers 500 or 502 (FIG. 5) of processing elements 108. Optionally, values could also be stored in the memory 402. As such, C0_0 represents the data value stored in a first processing element 108. C1_0 represents the data value stored in a second processing element 108. The processing elements represented by C0_0, C1_0, C2_0, etc. are all processing elements in the same row (for example the horizontal row of processing elements 108 seen in FIG. 1 or the n, n+1, n+2, etc. row of processing elements illustrated in FIG. 2). The processing elements represented by C0_1, C1_1, C2_1, etc. are all processing elements in the next row (for example the horizontal row of processing elements 108 below the row C0_0, C1_0, C2_0, etc.).

FIG. 8 shows an example of row to row data sorting (i.e.: sorting values down a column), in the simple case of three processing elements 108 corresponding to C0_0, C0_1, and C0_2. At the start of the sort, processing element $C_{0\_1}$ has a retained value stored therein. Next, processing element C0_0 passes a value down to element C0_1. Processing element $C_{0\_1}$ then uses retention logic to decide whether to pass its previously retained or its recently inputted value down to processing element C0_2. The retention logic used to make this determination may be programmed or configured to "pass the larger number down" or "pass the smaller number down" as desired. The number that is not passed down can simply be retained. In the case that the input and retained values are the same, that (same) value will be passed down. Returning to FIG. 7, element C0_0 will pass a value down to element C0_1, which will then pass a value down to element C0_2, etc. Similarly, the data in element C1_0 will pass a value down to element C1_1, which will then pass a value down to element C1_2, etc. As can be appreciated, if the present system is configured to pass the smallest numbers down, then all of the largest stored values will accumulate in the processing elements. Conversely, if the present system is configured to pass the largest numbers down, then all of the smallest stored values will accumulate in the processing elements. The processing elements in each row of processors operate in lockstep, with the controller 106 commanding a row 104 of processing elements 108 to perform the same operation, such that processing elements 108 all perform the same operation at the same time. A benefit of this approach is that in requires only minimal memory requirements. Specifically, a long list of numbers can be sorted, but as they pass through a string of processing elements 108, each processing element need only store two numbers in memory (i.e.: the passed down number and the retained number). As a result, there is no need to store the long list of numbers in memory for future sorting.

The same applies to other examples, in which a processing element 108 stores and compares more than two numbers. The set of processing elements 108 need only store the currently relevant subset of a stream of numbers, i.e., the leading candidates for the particular criterion, such a largest or smallest. For example, 50 processing elements 108 may each store 20 numbers that are sorted internally to the processing element 108, with the processing element 108 passing down to the next processing element 108 any of the 20 stored numbers and a newly received number that is outside its internal sorted set.

In preferred aspects, therefore, column C0 could have its values used as the basis of the sorting operation with column C1 being sorted in the same way, but based on a sorting decision made from the values in column C0. For example, column C0 could contain probabilities and column C1 could contain box coordinates. To sort the box coordinates by probability, the sorting proceeds down column C0, however, the corresponding C1 values are simply passed down the column without being compared against one another. It is to be understood, therefore, that although sorting may be carried out in multiple columns, it need not be carried out down all columns all of the time.

However, in other preferred aspects, one column (e.g.: C0_0, C0_1, C0_2, etc.) of processing elements can be sorting one category of data while another column of processing elements (e.g.: C1_0, C1_1, C1_2, etc.) can be sorting another category of data. The number of different parallel data streams that can be sorted will correspond to the number of processing elements in each row. As such, multiple categories of data can be sorted in parallel across parallel columns of processing elements. For example, if there are 64 processing elements in each row, then 64 categories of data can be simultaneously sorted.

In some respects, the present array of processing elements operates similar to a filtering system where data moves down the array from one row to the next with the largest (or smallest) values accumulating in the bottom row. This is especially useful when using an SSD neural net since SSD neural nets involve assessing probabilities stored in multiple candidate boxes within a frame. As such, the present system has the advantage that the multiple processing elements 108 in a row can all operate under the same SIMD instructions (e.g.: to pass down the largest (or smallest) number received). The last processing element in the column retains the greater (or lesser) value and discards the unwanted value. Since each processing element then passes a value to the corresponding processing element in the row below, true parallel sorting of different data streams is achieved.

The present hardware system for sorting has many advantages. For example, each processing element only has to compare two values and select one. As such, all of the processing elements in the array can operate under the same simple instruction set. Simply put, all the processors can operate the same way. In addition, only the minimum amount of data items that need to be retained are actually retained. Data travels in one direction. Values being sorted do not have to be swapped back and forth. By using the present processing element array format, there is no need to swap data between processing elements that are different distances apart. All of this saves time and energy. Furthermore, data transfers do not need to be made one processing element at a time. Rather, they could be grouped into blocks of multiple elements to reduce processing overhead. The present system also offers the advantage of distributing the same algorithm over a number of discrete processing elements.

Preexisting sorting systems tend to work with static inputs. In contrast, an advantage of the present system is that it can operate with a streaming succession of data inputs.

In various preferred aspects, each processing element may have a series of multiple elements therein. Thus, as understood herein, a processing element may be a single processing element, a series or sequence of processing elements or a sub-series or sub-sequence of processing elements.

The present system can optionally be used in any RN34-SSD or MobileNet-SSD software product or any other product that uses Non-Maximum Suppression (NMS). These software products are merely exemplary and it is to be understood that the present system can be used in other hardware or software configurations and architectures, all keeping within the scope of the present invention.

In FIG. 7, an exemplary processor C0_0 could store a probability while C1_0, C2_0 and C3_0 could all store separate corresponding box coordinates. This is because it may take several columns to store box coordinate data for a particular probability (for example, C1_0 could store box coordinate (X0,Y0) and C2_0 could store box coordinate (X1, Y1), etc.). In all of the various aspects and applications of the present system, it is to be understood that each processing element can store such data therein and a processing element is not limited to simply storing a single numerical data value therein.

Figure 9:
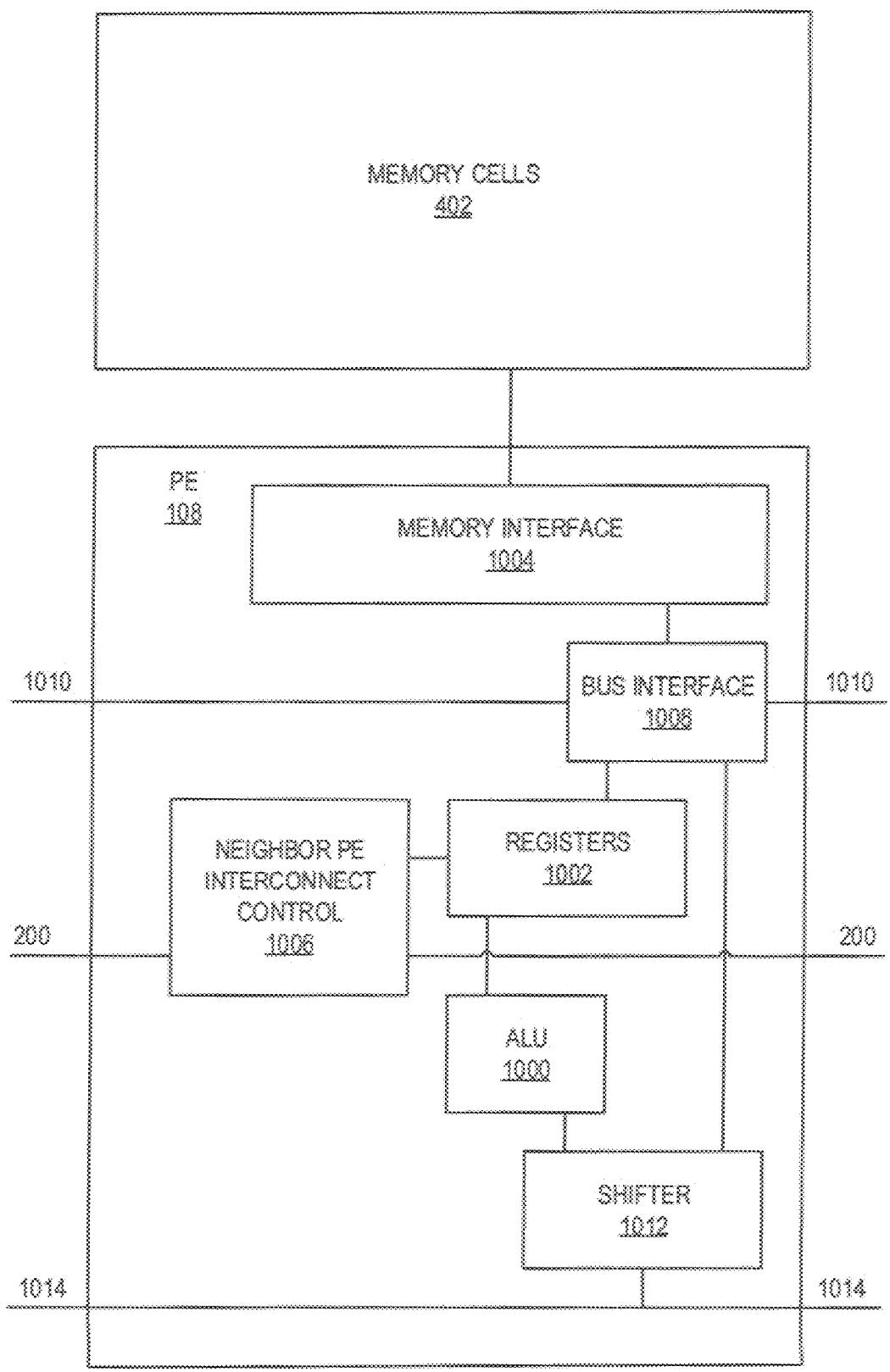
FIG. 9 is a block diagram of an example processing element and related memory cells.

FIG. 9 shows an example PE 108 schematically. The PE 108 includes an ALU 1000, registers 1002, a memory interface 1004, and neighbor PE interconnect control 1006.

The ALU 1000 performs the operational function of the PE. The ALU 1000 may include an adder, multiplier, accumulator, or similar. In various examples, the ALU 1000 is a multiplying accumulator. The ALU 1000 may be connected to the memory interface 1004, directly or indirectly, through the registers 1002 to share information with the memory cells 402. In this example, the ALU 1000 is connected to the memory interface 1004 though the registers 1002 and a bus interface 1008.

The registers 1002 are connected to the ALU 1000 and store data used by the PE 108. The registers 1002 may store operands, results, or other data related to operation of the ALU 1000, where such data may be obtained from or provided to the memory cells 402 or other PEs 108 via the neighbor PE interconnect control 1006.

The memory interface 1004 is connected to the memory cells 402 and allows for reading/writing at the memory cells 402 to communicate data with the registers 1002, ALU 1000, and/or other components of the PE 108.

The neighbor PE interconnect control 1006 connects to the registers 1002 and controls communication of data between the registers 1002 and like registers of neighboring PEs 108, for example via interconnections 200 (FIG. 2), and/or between a controller (see 106 in FIG. 3). The neighbor PE interconnect control 1006 may include a logic/switch array to selectively communicate the registers 1002 to the registers 1002 of neighboring PEs 108, such as first, second, fourth, or sixth neighbor PEs. The neighbor PE interconnect control 1006 may designate a single neighbor PE 108 from which to obtain data. That is, the interconnections 200 may be restricted so that a PE 108 only at most listens to one selected neighbor PE 108. The neighbor PE interconnect control 1006 may connect PEs 108 that neighbor each other in the same row. Additionally or alternatively, a neighbor PE interconnect control 1006 may be provided to connect PEs 108 that neighbor each other in the same column.

The PE may further include a bus interface 1008 to connect the PE 108 to a bus 1010, such as a direct memory access bus. The bus interface 1008 may be positioned between the memory interface 1004 and registers 1002 and may selectively communicate data between the memory interface 1004 and either a component outside the PE 108 connected to the bus 1010 (e.g., a main processor via direct memory access) or the registers 1002. The bus interface 1008 may control whether the memory 402 is connected to the registers 1002 or the bus 1010.

The PE may further include a shifter circuit 1012 connected to the ALU 1000 and a wide-add bus 1014 to perform shifts to facilitate performing operations in conjunction with one or more neighbor PEs 108.

Figure 10:
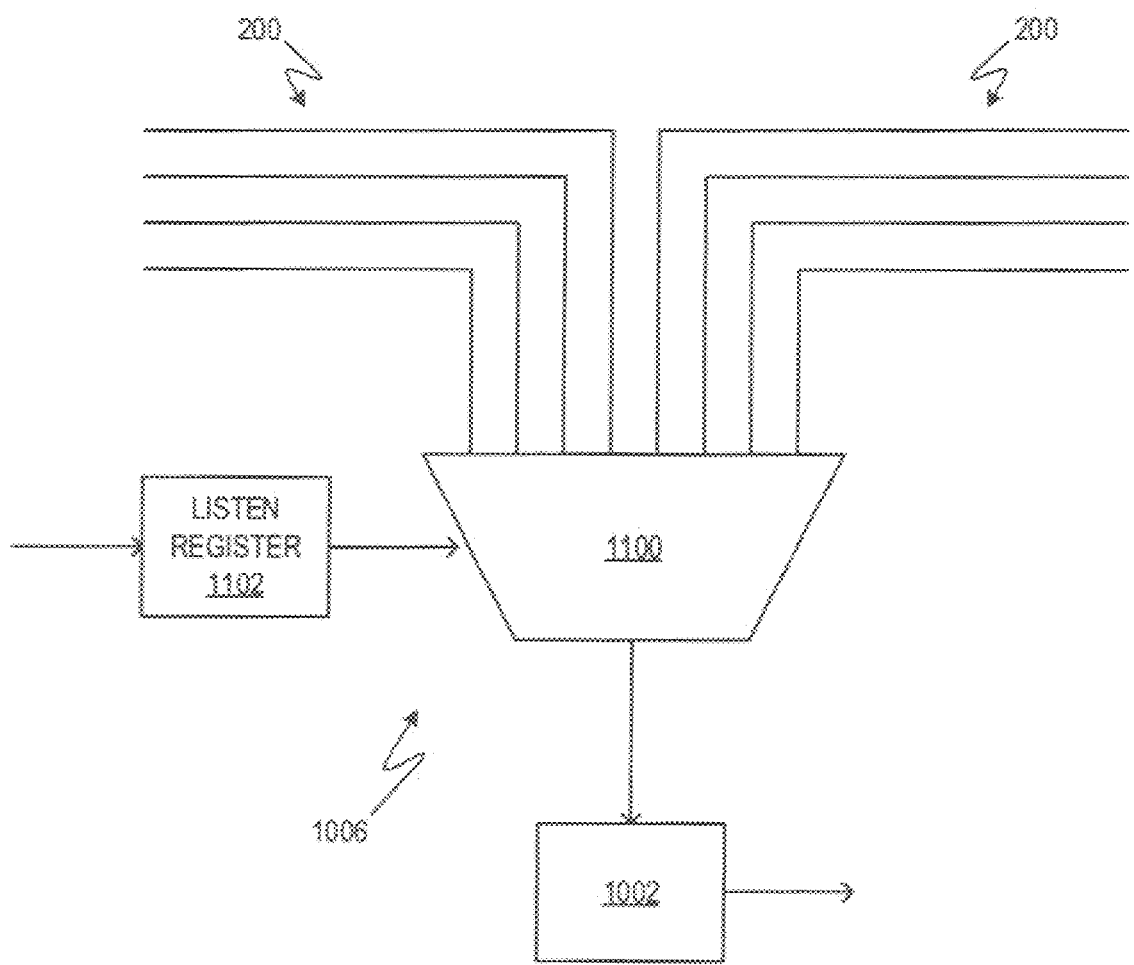
FIG. 10 is a block diagram of an example of the neighbor processing element interconnect control of FIG. 9.

FIG. 10 shows an example of the neighbor PE interconnect control 1006. The neighbor PE interconnect control 1006 includes a multiplexer 1100 or similar switch/logic array and a listen register 1102.

The multiplexer 1100 selectively communicates one interconnection 200 to a neighbor PE 108 to a register 1002 used for operations of the PE 108 to which the neighbor PE interconnect control 1006 belongs. Hence, a PE 108 listens to one neighbor PE 108.

The listen register 1102 controls the output of the multiplexer 1100, that is, the listen register 1102 selects a neighbor PE 108 as source of input to the PE 108. The listen register 1102 may be set by an external component, such as a controller 106 (FIG. 3), or by the PE 108 itself.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A device comprising:
   an array of processing elements configured for single-instruction, multiple data (SIMD) operation, wherein each processing element includes logic and memory configured as a subsequence of sorting elements, such that the array of processing elements provide a sequence of sorting elements configured to receive a sequence of values to sort;
   each sorting element of the sequence of sorting elements configured to compare an input value and a retained value simultaneously with each other element comparing respective input values and respective retained values, wherein the input value is received at the sorting element from a previous sorting element in the sequence of sorting elements or from an input to the sequence of sorting elements, and wherein the retained value is stored at the sorting element;
   wherein the sorting element is configured to retain at the sorting element one of the input value and the retained value, and wherein the sorting element is configured to pass the other of the input value and the retained value to a next sorting element in the sequence of sorting elements;
   wherein the array of processing elements is configured to output the sequence of values as sorted.

2. The device of claim 1, wherein the sorting element is configured to:
   numerically compare the input value to the retained value;
   retain a greater of the input value and the retained value; and
   pass a lesser of the input value and the retained value to the next sorting element.

3. The device of claim 1, wherein the sorting element is configured to:
   numerically compare the input value to the retained value;
   retain a lesser of the input value and the retained value; and
   pass a greater of the input value and the retained value to the next sorting element.

4. The device of claim 1, wherein the sorting element is configured to:
   numerically compare the input value to the retained value, and if the input value is equal to the retained value; then pass either the input value or the retained value to the next sorting element.

5. The device of claim 1, wherein the sorting element is programmable.

6. The device of claim 1, wherein a terminal sorting element of the sequence of sorting elements is configured to retain at the terminal sorting element one of the input value and the retained value, and wherein the terminal sorting element is configured to discard the other of the input value and the retained value.

7. The device of claim 1, further comprising a controller configured to control the array of processing elements to simultaneously operate the sequence of sorting elements.

8. A device comprising:
   an array of processing elements configured for single-instruction, multiple data (SIMD) operation, wherein each processing element includes logic and memory configured as a sorting element of an array of sorting elements including logically parallel sequences of sorting elements, each sequence of sorting elements configured to receive a sequence of values to sort;
   each sorting element of each sequence of sorting elements configured to compare an input value and a retained value simultaneously with each other element comparing respective input values and respective retained values, wherein the input value is received at the sorting element from a previous sorting element in the sequence of sorting elements or from an input to the sequence of sorting elements, and wherein the retained value is stored at the sorting element;
   wherein the sorting element is configured to retain at the sorting element one of the input value and the retained value, and wherein the sorting element is configured to pass the other of the input value and the retained value to a next sorting element in the sequence of sorting elements;
   wherein each sequence of sorting elements is configured to output the sequence of values as sorted.

9. The device of claim 8, wherein the sorting element is configured to:
   numerically compare the input value to the retained value;
   retain a greater of the input value and the retained value; and
   pass a lesser of the input value and the retained value to the next sorting element.

10. The device of claim 8, wherein the sorting element is configured to:
    numerically compare the input value to the retained value;
    retain a lesser of the input value and the retained value; and
    pass a greater of the input value and the retained value to the next sorting element.

11. The device of claim 8, wherein the sorting element is configured to:
    numerically compare the input value to the retained value, and if the input value is equal to the retained value; then pass either the input value or the retained value to the next sorting element.

12. The device of claim 8, wherein the sorting element is programmable.

13. The device of claim 8, wherein a terminal sorting element of the logically parallel sequence of sorting elements is configured to retain at the terminal sorting element one of the input value and the retained value, and wherein the terminal sorting element is configured to discard the other of the input value and the retained value.

14. The device of claim 8, wherein each processing element includes a single sorting element of the logically parallel sequence of sorting elements.

15. The device of claim 8, wherein each processing element includes a subsequence of sorting elements of the logically parallel sequence of sorting elements.

16. The device of claim 8, further comprising a controller configured to control the array of processing elements to simultaneously operate the logically parallel sequences of sorting elements.

* * * * *